(12) United States Patent
Firpo-Triplett et al.

(10) Patent No.: US 10,977,960 B2
(45) Date of Patent: Apr. 13, 2021

(54) SYSTEM AND METHOD FOR PERSONALIZED RENDERING OF DIGITIZED INSTANCES OF MODELING OF USER-IDENTIFIED TEACHING MICROSKILLS

(71) Applicants: Regina Marie Firpo-Triplett, Felton, CA (US); Tamara Jean Kuhn, Scotts Valley, CA (US)

(72) Inventors: Regina Marie Firpo-Triplett, Felton, CA (US); Tamara Jean Kuhn, Scotts Valley, CA (US)

( * ) Notice: Subject to any disclaimer, the term of this patent is extended or adjusted under 35 U.S.C. 154(b) by 391 days.

(21) Appl. No.: 15/916,247

(22) Filed: Mar. 8, 2018

(65) Prior Publication Data

US 2019/0279530 A1  Sep. 12, 2019

Related U.S. Application Data

(60) Provisional application No. 62/639,933, filed on Mar. 7, 2018.

(51) Int. Cl.
*G09B 23/00* (2006.01)
*G09B 5/14* (2006.01)
*G09B 5/02* (2006.01)

(52) U.S. Cl.
CPC .............. *G09B 23/00* (2013.01); *G09B 5/02* (2013.01); *G09B 5/14* (2013.01)

(58) Field of Classification Search
CPC ............ G09B 23/00; G09B 5/14; G09B 5/02
See application file for complete search history.

(56) References Cited

U.S. PATENT DOCUMENTS

| | | | | |
|---|---|---|---|---|
| 9,031,382 B1* | 5/2015 | Kaiser | ............. | G11B 27/00 386/248 |
| 2003/0195834 A1* | 10/2003 | Hillis | ............. | G06Q 40/04 705/37 |
| 2009/0035733 A1* | 2/2009 | Meitar | ............. | G09B 7/00 434/118 |
| 2014/0377732 A1* | 12/2014 | Freedman | ............. | G09B 5/10 434/322 |
| 2015/0194064 A1* | 7/2015 | Young | ............. | G09B 5/10 434/350 |
| 2015/0206441 A1* | 7/2015 | Brown | ............. | G09B 5/00 434/308 |

* cited by examiner

*Primary Examiner* — Robert J Utama
(74) *Attorney, Agent, or Firm* — Patrick Reilly

(57) ABSTRACT

A system and method for characterizing, selecting, ordering and rendering discrete elements of digitized video content to teach communications and pedagogic skills. Each of a plurality of observed or computer-generated instances of modeling of distinguishable teaching skills are recorded as digitized assets. Microskills are identified and deconstructed in the abstract from one or more of the visual and audible recordings of teaching skills modeling moments. Identifiers of microskills are associated by a human editor with recorded modeling instances and/or portions thereof. Modeling presentations are dynamically generated by a user asserting one or more microskill identifiers and a network-enabled selection, ordering and rendering of portions of modeling instances that are associated with the asserted microskill identifiers.

21 Claims, 12 Drawing Sheets

REQ.MSG.001

| LB.ADDR | NET.ADDR | REQ.MSQ.ID.001 | RMSG.DTS.001 |
|---|---|---|---|
| MS.ID.004 | MS.ID.811 | NF.006 | AUD.854 |

FIGURE 8B

SYSTEM AND METHOD FOR PERSONALIZED RENDERING OF DIGITIZED INSTANCES OF MODELING OF USER-IDENTIFIED TEACHING MICROSKILLS

CO-PENDING APPLICATION

The present Nonprovisional Patent Application is a Continuation Application of U.S. Provisional Patent Application Ser. No. 62/639,933 titled "SYSTEM AND METHOD FOR PERSONALIZED RENDERING OF DIGITIZED INSTANCES OF MODELING OF USER-IDENTIFIED TEACHING MICROSKILLS" and filed on Mar. 7, 2018. The present Nonprovisional Patent Application claims the priority date of U.S. Provisional Patent Application Ser. No. 62/639,933. Furthermore, U.S. Provisional Patent Application Ser. No. 62/639,933 is hereby incorporated into the present Nonprovisional Patent Application in its entirety and for all purposes.

FIELD OF THE INVENTION

The present invention is in the field of educational technology and more particularly relates to communications and pedagogic training.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Observing excellent or even competent experienced teachers in action can present opportunities to learn the skills useful in the discipline of teaching. Fortunately, information technology enables the digitized capture of teaching performances wherein teaching skills are instantiated. These digitized assets may then be made available for viewing upon demand by prior art methods and means via electronics communications networks. Yet the prior art fails to systemically distinguish in a given digital asset between the relevance of learning how to teach from the goal of learning how to present a particular subject matter.

Moreover, the prior art addresses teaching skills in the aggregate and fails to optimally apply a deconstruction of components of pedagogic skills for the object of characterizing and organizing digitized assets for personalized instruction in the field of teaching how to teach.

It is thus an object of the method of the present invention, hereinafter, "the invented method", to provide systems and methods to enable the identification and dynamic organization of digitized recordings of teaching actions to render presentations designed to sequentially present user-selected instances of elements of teaching skills. It is understood that the meaning of the term user as expressed within the present disclosure includes both an intended observer of rendered digital assets and additionally or alternatively a person or information technology process intending to generate presentations to improve teaching capabilities of observers of the rendered digital assets.

SUMMARY AND OBJECTS OF THE INVENTION

Towards these and other objects of the method of the invented method that are made obvious to one of ordinary skill in the art in light of the present disclosure, the invented method identifies components of identified teaching skills and associates the teaching skill components with digitized presentations that model the teaching skill components, i.e., microskills.

A first preferred embodiment of the invented method includes one or more of the aspects of (a.) identifying a plurality of teaching microskills; (b.) assigning a unique microskill identifier to each teaching microskills in a one-to-one correspondence; (c.) digitally recording a plurality of digitized video models, wherein each digitized video model ("video model") records a demonstration of at least one teaching microskills applied in a presentation of at least one information element to an audience; (d.) assigning microskill identifiers to video models that model the associated microskill; (e.) selecting a group of microskill identifiers; (f.) selecting a group of video models that are each associated with at least one microskill identifier of a selected group of microskill identifiers; and/or (g.) rendering a group of video models in a linear sequence in the presence of the human observer as selected on a criteria of specified microskill identifiers.

Additional, alternative and/or optional aspects of certain alternate preferred embodiments of the invented method include, in singularity or in combination, (a.) the rendering the first group of video models is performed by means of user interaction over an electronics communications network; (b.) selecting at least partially in consideration of an audience characteristic assigned to an intended audience associated with the practitioner, wherein the audience characteristic may be partially derived from an experience level parameter, a demographic parameter, and/or a psychographic parameter; (c.) insuring that no two video models of a selected group of video models are assigned a same microskill identifier and/or a same information identifier; (d.) selecting a linear microskills sequence of microskill identifiers and rendering the first group of video models in the linear microskills sequence in the presence of the practitioner; and/or (e.) selecting a sequence of microskill identifiers and rendering the first group of video models in the order of the selected sequence of microskill identifiers.

It is understood that the term "practitioner" as defined and employed herein may be any human being who is intending to or intended to perform a teaching action or performance, to include parents and children.

Certain other alternate preferred embodiments of the invented method additionally, alternatively and/or optionally include, in singularity or in combination, one or more of the aspects of (a.) assigning a unique information identifier to each of a plurality of information elements; (b.) assigning at least one information identifier to at least two video models of the plurality of video models; and/or (c.) selecting a sequence of information identifiers and rendering the first group of video models in the order of the selected sequence of information identifiers.

Certain yet other alternate preferred embodiments of the invented method additionally, alternatively and/or optionally include, in singularity or in combination, one or more of the aspects of (a.) associating a related network addresses with the first group of video models, wherein related network address is selectively applied by the practitioner to access additional information; (b.) associating a plurality of related network addresses with the first group of video models, wherein each related network address is selectively applied by the practitioner to access additional information; (c.) rendering at least one selectable representation of at least one related network address simultaneously with the rendering of the first group of video models; (d.) assigning an audience characteristic value to at least one video model and a selecting the first group of video models in a process of matching the audience characteristic value; (e.) assigning a practitioner characteristic value to at least one video model and selecting the first group of video models in a process of matching the practitioner characteristic value.

Certain still other alternate preferred embodiments of the invented method additionally, alternatively and/or optionally include, in singularity or in combination, one or more of the aspects of (a.) assigning a unique information identifier to each of a plurality of information elements; (b.) assigning at least one information identifier to at least two video models of the plurality of video models; (c.) selecting an information identifier; (d.) selecting a third group of video models that are each assigned the selected information identifier; (e.) rendering the third group of video models for observation by the practitioner; and/or (f.) selecting video models of the third group in view of an associated indication of an audience characteristic.

Certain even other alternate preferred embodiments of the invented method additionally, alternatively and/or optionally include, in singularity or in combination, one or more of the aspects of (a.) selecting a first group of information identifiers from a plurality of information identifiers; (b.) selecting a second group of video models, wherein each microskills information identifier of the first group of microskill identifiers is assigned to at least one video model of the second group of video models, and each information identifier of the first group of information identifiers is assigned to at least one video model of the second group of video models; and/or (c.) rendering the second group of video models in a linear sequence in the presence of the practitioner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 7,827,488 (Sitrick; issued Nov. 2, 2010) titled "Image tracking and substitution system and methodology for audiovisual presentations"; U.S. Pat. No. 7,423,213 (Sitrick; issued Sep. 9, 2008) titled "Multi-dimensional transformation systems and display communication architecture for compositions and derivations thereof"; U.S. Pat. No. 9,911,223 (Song, et al.; issued Mar. 6, 2018) titled "Automatic video segment selection method and apparatus"; and US Patent Appn. Pub. Ser. No. 20160330526 (Marchetti; Marco, et al.; published Nov. 10, 2016) titled "Method and System for Automatically Selecting Parts of a Video and/or Audio Media Content Based on Information Obtained from Social Networks" are incorporated herein by reference in their entirety and for all purposes.

BRIEF DESCRIPTION OF THE FIGURES

The detailed description of some embodiments of the invention is made below with reference to the accompanying Figures, wherein like numerals represent corresponding parts of the Figures.

FIG. 8B is a block diagram of an exemplary request record as generated by a viewing system of FIG. 1;

DETAILED DESCRIPTION

Figure 1:
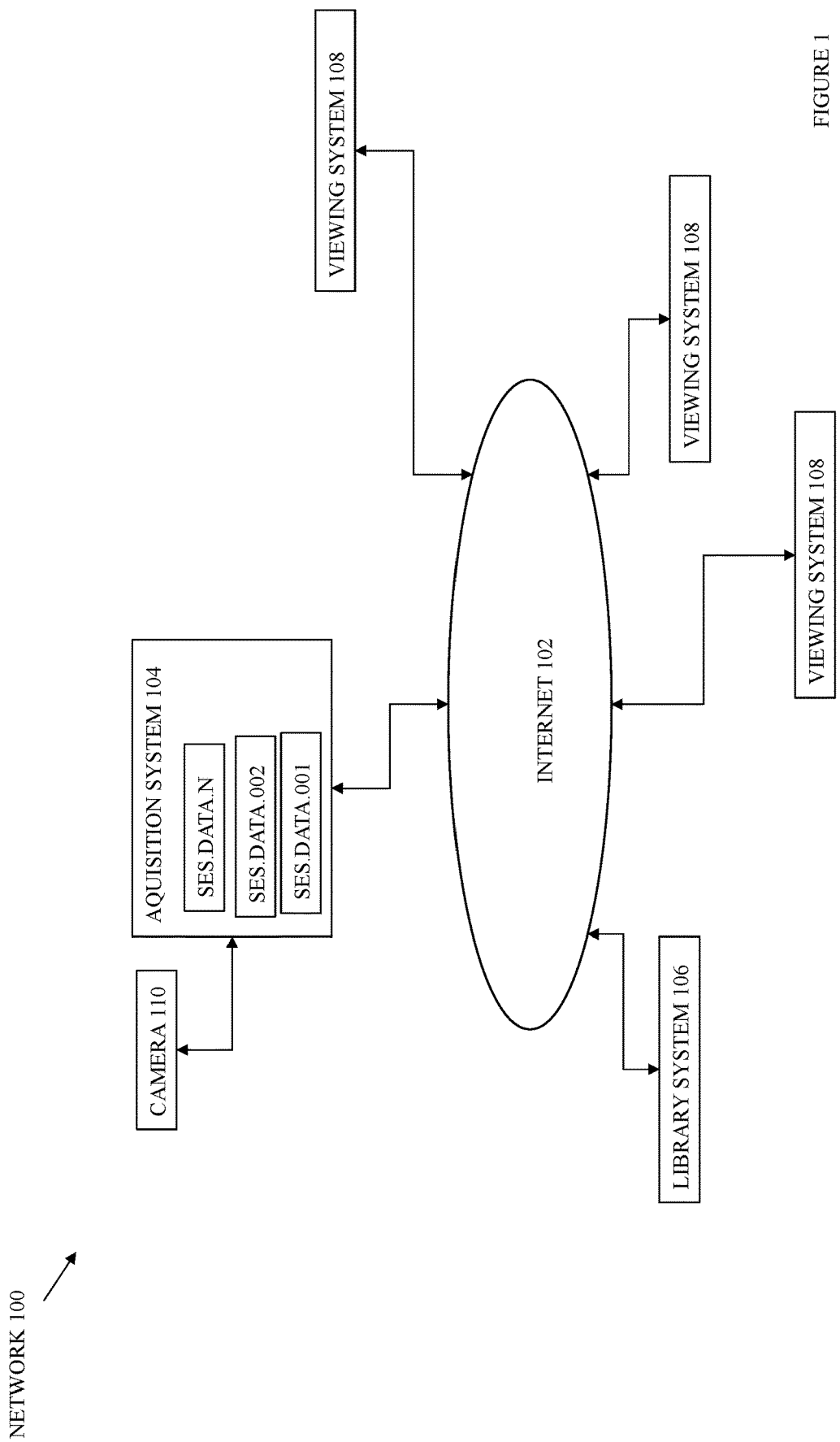
FIG. 1 is a block diagram of an electronic communications network by which the first method is implemented.

FIG. 1 through FIG. 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/ or alternatives of embodiments of the present disclosure. In describing the drawings, similar reference numerals may be used to designate similar constituent elements.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

It is understood that the designator ".N" is applied in the present disclosure to indicate an arbitrarily large quantity of items limited only by the operational capacity of a comprising system, memory or equipment.

Referring now generally to the Figures and particularly to FIG. 1, FIG. 1 is a block diagram of an electronic communications network 100 by which the first method is implemented. The electronic communications network 100 comprises an electronic communications network, such as the Internet 102, a telephony network and/or other digital communications network in singularity or combination. The electronic communications network 100 (hereinafter, "the network" 100) further comprises a modeling session acquisition system 104, a library system 106 and a plurality of viewing systems 108. The network 100 bi-directionally communicatively couples the modeling session acquisition system 104, the library system 106 and the plurality of viewing systems 108.

A digital camera module 110 is communicatively coupled with the acquisition system 104. The digital camera module 110 generates discrete session data SES.DATA.001-SES.DATA.N, wherein each session data SES.DATA.001-SES.DATA.N preferably comprises digitized representations of audible and visual images of teaching sessions. Preferably, each recorded teaching session memorialized by a session data SES.DATA.001-SES.DATA.N includes an instantiation of one or more teaching microskills. The session data SES.DATA.001-SES.N are received by the acquisition system 104 and thereafter copies of the session data SES.DATA.00-SES.N are transferred via the network 100 from the acquisition system 104 to the library system 106. The session data SES.DATA.00-SES.DATA.N stored in the library system 106 are preferably accessible by each of the viewing systems 108 via the network 106.

The acquisition system 104, the library system 106, and/or one or more viewing systems 108 may be or comprise a bundled hardware and software informational technology product or system including but not limited to (a.) a network-communications enabled THINKSTATION WORKSTATION (™) notebook computer marketed by Lenovo, Inc. of Morrisville, N.C.; (b.) a NIVEUS 5200 computer workstation marketed by Penguin Computing of Fremont, Calif. and running a LINUX (™) operating system or a UNIX (™) operating system; (c.) a network-communications enabled personal computer configured for running WINDOWS XP (™), VISTA (™) or WINDOWS 7 (™) operating system marketed by Microsoft Corporation of Redmond, Wash.; (d.) a MACBOOK PRO (™) personal computer as marketed by Apple, Inc. of Cupertino, Calif.; (e.) an IPAD (™) tablet computer as marketed by Apple, Inc. of Cupertino, Calif.; (f.) an IPHONE (™) cellular telephone as marketed by Apple, Inc. of Cupertino, Calif.; (g.) an HTC TITAN II (™) cellular telephone as marketed by AT&T, Inc. of Dallas, Tex. and running a WINDOWS 7 (™) operating system as marketed by Microsoft Corporation of Redmond, Wash.; (h.) a GALAXY NEXUS (™) smart phone as marketed by Samsung Group of Seoul, Republic of Korea or and running an ANDROID (™); (i.) a TOUGHPAD (™) tablet computer as marketed by Panasonic Corporation of Kadoma, Osaka, Japan and running an ANDROID (™) operating system as marketed by Google, Inc. of Mountain View, Calif.; or (j.) other suitable mobile electronic device, wireless communications device, tablet computer, smartphone, or computational system or electronic communications device known in the art.

It is understood that the digital camera module 110 may partially or wholly comprised with the acquisition system 104 in various alternate preferred embodiments of the invented method.

Figure 2:
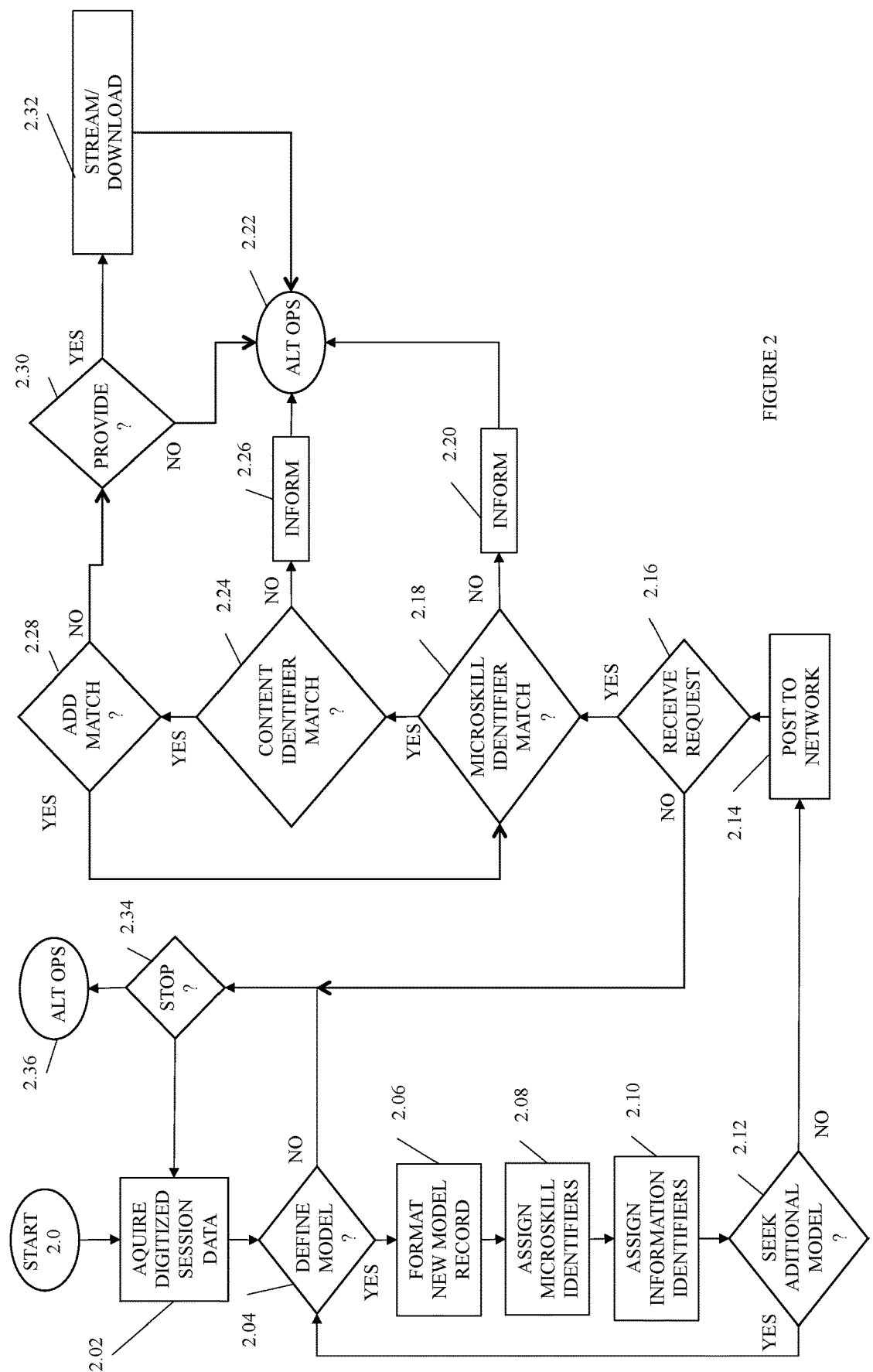
FIG. 2 is a flowchart of the first method as implemented by the library system in concert with the network of FIG. 1.

Referring now generally to the Figures and particularly to FIG. 2, FIG. 2 is a flowchart of the first method as implemented by the library system 106 in concert with the network 100. The library system 106 powers up and boots up in step 2.00 and acquires an exemplary first session data SES.DATA.001 via the network 100 in step 2.02. The library system 106 thereupon within step 2.02 generates a first exemplary session record SES.REC.001 populated with the first session data SES.DATA.001. In step 2.04 the library system 106 determines if a user, hereinafter, "the editor", has identified and defined an exemplary selected first model data MDL.001 selected from the first session data SES.DATA.001. It is understood that the first model data MDL.DATA.001 may alternatively be all or a portion of the first session data SES.DATA.001.

The library system 106 formats an exemplary first model record MDL.REC.001 in step 2.06 and further populates the first model record MDL.REC.001 with both the first model data MDL.DATA.001 and a unique first model record identifier MDL.ID.001. Optionally in step 2.06, the library system 106 also writes the first model record identifier MDL.ID.001 into the first session record SES.REC.001.

As directed by the editor of the library system 106, the library system 106 receives and populates the first model record MDL.REC.001 with one or more microskill identifiers MS.ID.001 & MD.ID.004 in step 2.08, and optionally populates the first session record SES.REC.001 with the one or more received microskill identifiers MDL.ID.001 & MDL.ID.004 if directed by the editor. In optional step 2.10, as directed by the user, the library system 106 receives and populates the first model record MDL.REC.001 with one or more informational content identifiers NF.ID.001 & NF.ID.006, and optionally populates the first session record SES.REC.001 with the one or more informational content identifiers NF.ID.001 & NF.ID.006 as directed by the editor.

The library system 106 is directed by the editor in step 2.12 to either (a.) return to step 2.04 and to define and identify and define additional model data MDL.DATA.002-MDL.N as specified by the editor and thereafter generate additional model records MDL.002-MDL.REC.N that each contain some or all of the first session data SES.DATA.001 in following executions of steps 2.06 through 2.10, or alternatively (b.) proceed from step 2.10 to step 2.14 and post the newly generated model records MDL.REC.001-MDL.REC.N for accessing and rendering via the network 100.

The library system 106 proceeds from step 2.14 to step 2.16 and determines if an access request has been received via the Internet 102. When the library system 106 determines that an access request has been received, the library system 106 proceeds to step 2.18 and determines if the received access request contains a microskill identifier MS.ID.001-MS.ID.N contained within or otherwise associated with any model records MDL.REC.001-MDL.REC.N stored with the library system 106 or accessible by the library system 106 via the network 100. When the library system 106 determines in step 2.18 that the access request received in step 2.16 does not contain even one microskill identifier MS.ID.001-MS.ID.N contained within or otherwise associated with any model records MDL.REC.001-MDL.REC.N accessible to the library system 106, the library system 106 proceeds to step 2.20 and generates and transmits via the network 100 a response message that informs the originator of the access request message of the failure to match a microskill identifier MS.ID.001-MS.ID.N of the access request with any model record MDL.REC.001-MDL.REC.N.

Optionally, alternatively or additionally, the access request may include an indication or identifier of an audience characteristic assigned to an intended audience associated with the practitioner, wherein the audience characteristic may be partially derived from an experience level parameter, a demographic parameter, and/or a psychographic parameter; and the library system 106 proceeds in steps 2.18 and 2.24 to select model records MDL.REC.001-MDL.REC.N associated with the indication or the identifier of the audience characteristic assigned to the intended audience associated with the practitioner, wherein the audience characteristic may be partially derived from an experience level parameter, a demographic parameter, and/or a psychographic parameter of, or presumed of, the intended audience.

The library system 106 proceeds from step 2.20 to step 2.22 and performs additional computational processes, to include a return to a following execution of step 2.02. In the alternative, when the library system 106 recognizes a match of at least one microskill identifier MS.ID.001-MS.ID.N of the access request with at least one model record MDL.REC.001-MDL.REC.N, the library system 106 proceeds onto execute optional step 2.24.

The library system 106 proceeds in optional 2.24 to determine if the received access request contains one or more informational content identifiers NF.ID.001-NF.ID.N contained within or otherwise associated with the matching model records MDL.REC.001-MDL.REC.N selected in step 2.18. When the library system 106 determines in step 2.24 that the access request received in step 2.16 does not contain the matching model records MDL.REC.001-MDL.REC.N selected in step 2.18, the library system 106 proceeds to step 2.26 and generates and transmits via the network 100 additional alternative response message that informs the originator of the access request message of the failure to match an informational content identifiers NF.ID.001-NF.ID.N of the access request with the model records MDL.REC.001-MDL.REC.N. selected in step 2.18. The library system 106 proceeds from step 2.26 to step 2.22 and performs additional computational processes, to include a return to a following execution of step 2.02. It is understood that in other preferred alternate embodiments of the first method, that the library system 106 proceeds from either step 2.26 or step 2.24 to step.

It is understood that preferably when two or more microskill identifiers MS.ID.001-MS.ID.N are included with the access request message, that the microskill identifiers MS.ID.001-MS.ID.N interpreted by the library system 106 as being in a linear sequence and an attempt to match each microskill identifier MS.ID.001-MS.ID.N of the access request message is sequentially processed through separate instantiations of the loop of step 2.18 through 2.28. In step 2.28 the library system 106 determines if there remains microskill identifier MS.ID.001-MS.ID.N contained within the access request message that has not yet been examined for an attempted match with a model record MDL.REC.001-MD.REC.N in an execution of step 2.18. Optionally or alternatively, the library system 106 may automatically, or as directed by a user, add matches in consideration of an audience characteristic assigned to an intended audience associated instant request of step 2.16, wherein the audience characteristic may be partially derived from an experience level parameter, a demographic parameter, and/or a psychographic parameter.

When the library system 106 determines that there remains at least one microskill identifier MS.ID.001-MS.ID.N of the access request message that has not yet been applied in an attempted match with a model record MDL.REC.001-MD.REC.N, the library system 106 proceeds from step 2.28 and to an additional execution to step 2.18. In the alternative outcome to step 2.28, when the library system 106 determines that each microskill identifier MS.ID.001-MS.ID.N of the access request message that has been applied in an attempted match with a model record MDL.REC.001-MD.REC.N, the library system 106 proceeds to step 2.30 and determines whether to initiate transmission via the network 100 of the model records MDL.REC.001-MD.REC.N selected in the one or more executions of step 2.18 in response to receipt of the access request message detected in step 2.16. When the library system 106 determines in step 2.30 to initiate transmission of the selected model records MDL.REC.001-MDL.REC.N selected in step 2.18 via the network 100, in step 2.32 the library system 106 streams and/or downloads the selected model records MDL.REC.001-MDL.REC.N or alternatively the model data MDL.DATA.001-MDL.DATA.N contained within the selected model records MDL.REC.001-MDL.REC.N. After completion of streaming and/or downloading in step 2.32, the library system 106 proceeds from step 2.32 to step 2.22 and performs alternate computational operations.

In alternative aspects of the first method, when the library system 106 determines in step 2.14 to have not received an access message, the library system 106 proceeds to step 2.34 and determines whether to proceed on to either an additional execution of step 2.02 or to proceed to execute step 2.36 and performs alternate computational operations, to include a return to a following execution of step 2.02.

In additional alternative aspects of the first method, when the library system 106 determines in step 2.04 to not receive direction from the editor to generate a model record MDL.REC.001-MDL.REC.N, the library system 106 proceeds to step 2.34 and determines whether to proceed on to either an additional execution of step 2.02 or to proceed to execute step 2.36 and performs alternate computational operations.

Figure 3:
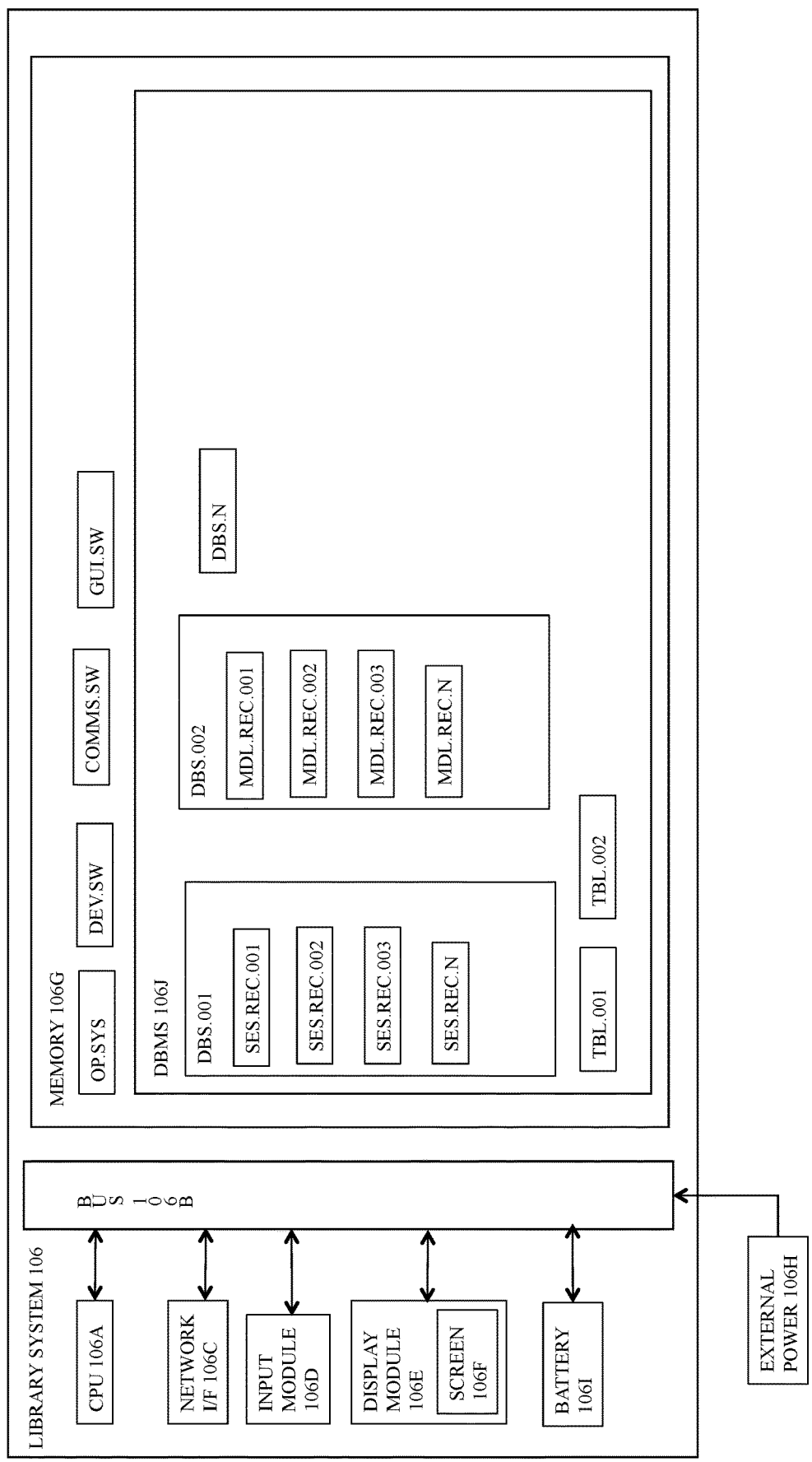
FIG. 3 is a block diagram of aspects of the library system of FIG. 1 and FIG. 2.

Referring now generally to the Figures and particularly to FIG. 3, FIG. 3 is a block diagram of aspects of the library system 106. The library system 106 includes a central processing unit 106A this is bi-directionally communicatively coupled via a power and communications bus 106B to a wireless network communications interface 106C, a user input module, and a video display module 106E having a display screen 106F. The central processing unit 106A

(hereinafter, "the CPU" 106A is further communicatively coupled with a system memory 106G via the power and communications bus 106B (hereinafter, "the bus" 106B. Alternatively or additionally an external power source 106H and/or and an electrical power battery 106I provides electrical power via the bus 106B to the CPU 106A, the user input module 106D, the display module 106E, the wireless communications interface 106C, and/or the device memory 106J.

The wireless communications interface 106C bi-directionally communicatively couples the library system 106 with the Internet 102.

The system memory 106J stores an operating system OP.SYS and a device software DEV.SW. The operating system OP.SYS enables the device software DEV.SW to direct the CPU 106A to cause the library system 106 to execute, generate or perform all, or more than one of, the essential aspects, communications and actions required to instantiate the invented method, and alternatively or additionally instantiate the optional aspects of the invented method, in collaboration with the Internet 102, the acquisition system 104 and the plurality of viewing systems 108.

The device memory 106G further preferably stores a graphic user interface software GUI.SW and a communications software COMMS.SW. The graphic user interface software GUI.SW enables the library system 106 to both visually render information via the display screen 106F and receive information and commands from a user or users via the user input module 106D. The communications software COMMS.SW enables the library system 106 to send and receive electronic messages and information to and from the Internet 102 via wireless communications interface 106C. The communications software COMMS.SW additionally or alternatively enables the library system 106 to send and receive electronic messages and information to and from the viewing system 108 by means of the device wireless communications interface 100F in combination with the network 100.

The system memory 106G further stores a data base management system 106J (hereinafter, "the DBMS" 106J). The DBMS 106J may be or comprise an object oriented database management system ("OODBMS"), a relational database management system ("RDBMS") and/or an NoSQL database management system, and one or more databases DBS.001-DBS.N, may be or comprise an object oriented database, a relational database and/or an NoSQL database. More particularly, the DBMS 106G may be or comprise one or more prior art database management systems including, but not limited to, an ORACLE DATABASE (™) database management system marketed by Oracle Corporation, of Redwood City, Calif.; a Database 2 (™), also known as DB2 (™), relational database management system as marketed by IBM Corporation of Armonk, N.Y.; a Microsoft SQL Server (™) relational database management system as marketed by Microsoft Corporation of Redmond, Wash.; MySQL (™) as marketed by Oracle Corporation of Redwood City, Calif.; and a MONGODB (™) as marketed by MongoDB, Inc. of New York City, USA; the POSTGRESQL (™) open source object-relational database management system; and/or a suitable commercially available NoSQL database.

The first database DBS.001 comprises a plurality of session records SES.REC.001-SES.REC.N and the second database DBS.002 comprises a plurality of model records MDL.REC.001-MDL.REC.N.

The system memory 106G further stores a microskills explanation table TBL.001 and a second table TBL.002. As presented in FIG. 6, the microskills explanation table TBL.001 associates and correlates microskill identifiers MS.ID.001-MS.ID.N with digitized textual microskill labels LBL.001-LBL.N and digitized microskill descriptions TXT.001-TXT.N. As presented in FIG. 7, the second table TBL.002 associates and correlates informational content identifiers NF.ID.001-NF.ID.N with digitized textual informational content labels NF.LBL.001-NF.LBL.N and digitized informational descriptions NF.TXT.001-NF.TXT.N.

Figure 4:
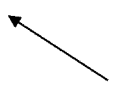
FIG. 4 is a block diagram of aspects of a first database of FIG. 1 and FIG. 2 and presenting block diagrams of a first exemplary session record.

Referring now generally to the Figures and particularly to FIG. 4, FIG. 4 is a block diagram of aspects of the first database DBS.001 and presenting block diagrams of an exemplary first session record SES.REC.001. The first session record SES.REC.001 includes a first session record identifier SES.ID.001 three model record identifiers MDL.ID.001, MDL.IB.002 & MDL.ID.010 associated with the first session record SES.REC.001, a plurality of microskill identifiers MS.ID.001-MS.ID.005 associated with the first session record SES.REC.001, a pair of informational content identifiers associated with the first session record SES.REC.001, and the first session data SES.001.

Figure 5:
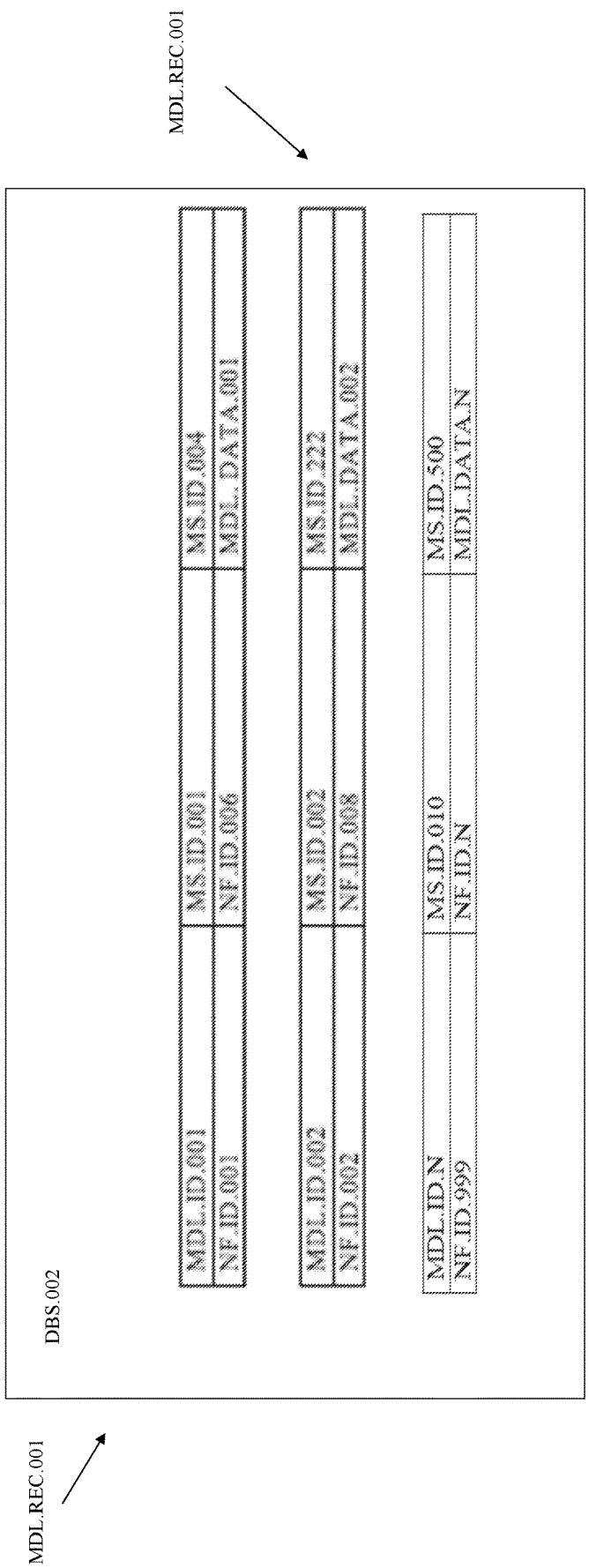
FIG. 5 is a block diagram of aspects of a second database of FIG. 1 and FIG. 2 and presenting block diagrams of exemplary model records.

Referring now generally to the Figures and particularly to FIG. 5, FIG. 5 is a block diagram of aspects of the second database DBS.002 and presenting block diagrams of exemplary model records MDL.REC.001-MDL.REC.N. The exemplary first model record MDL.REC.001 includes a first model record identifier MDL.ID.001, two microskills identifiers MS.ID.001 & MS.ID.004 associated with the first model record MDL.REC.001, two informational content identifiers NF.ID.001 & NF.ID.006 associated with the first model record MDL.REC.001, and the first model data MDL.DATA.001. It is understood that the first model data MDL.DATA.001 is a subset of, or entirely includes, the first session data SES.DATA.001.

An exemplary second model record MDL.REC.002 includes a second model record identifier MDL.ID.002, two microskills identifiers MS.ID.002 & MS.ID.222 associated with the second model record MDL.REC.002, two informational content identifiers NF.ID.002 & NF.ID.008 associated with the associated with the second model record MDL.REC.002, and the second model data MDL.DATA.002. It is understood that the second model data MDL.DATA002 is a subset of, or entirely includes, a session data SES.DATA.001-SES.DATA.N.

An exemplary Nth model record MDL.REC.N includes an Nth model record identifier MDL.ID.N, two microskills identifiers MS.ID.010 & MS.ID.N associated with the Nth model record MDL.REC.N, two informational content identifiers NF.ID.999 & NF.ID.N associated with the associated with the Nth model record MDL.REC.N, and the Nth model data MDL.DATA.N. It is understood that the Nth model data MDL.DATA002 is a subset of, or entirely includes, a session data SES.DATA.001-SES.DATA.N.

Figure 6:
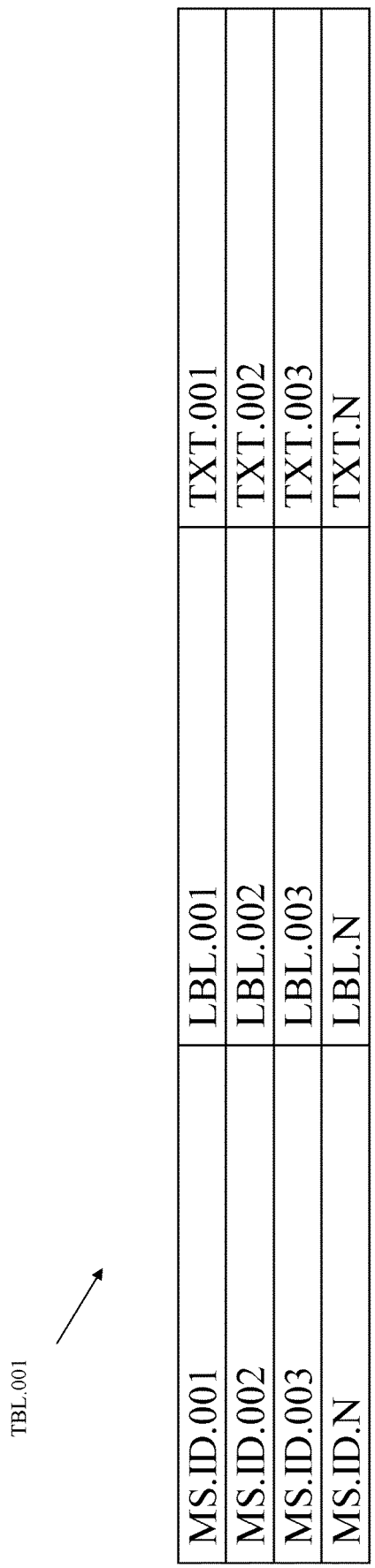
FIG. 6 is a block diagram of aspects of a model record identification table record of FIG. 1 and FIG. 2.

Referring now generally to the Figures and particularly to FIG. 6, FIG. 6 is a block diagram of aspects of the microskills explanation table TBL.001. The microskills explanation table TBL.001 associates and correlates microskill identifiers MS.ID.001-MS.ID.N with digitized textual microskill labels LBL.001-LBL.N and digitized textual microskill definitions TXT.001-TXT.N.

To clarify by way of example, a first row of the microskills explanation table TBL.001 associates a first microskill identifier MS.ID.001 with a first digitized microskill label LBL.001 that is a digitization of a human readable character string that identifies a first microskill to a human viewer; the first row of the microskills explanation table TBL.001 also associates the first microskill identifier MS.ID.001 with a first microskill textual definition TXT.001 that is digitization of a human-readable character string that defines the first microskill to a human viewer. A second row of the microskills explanation table TBL.001 associates a second microskill identifier MS.ID.002 with a second microskill label LBL.002 that is digitization of a human-readable character string that identifies a second microskill to a human viewer; the second row of the microskills explanation table TBL.001 further associates the second microskill identifier MS.ID.002 with a digitized second microskill textual definition TXT.002 that is digitization of a human-readable character string that defines the second microskill to a human viewer. A third row of the microskills explanation table TBL.001 associates a third microskill identifier MS.ID.003 with a third microskill label LBL.003 that is digitization of a human-readable character string that identifies a third microskill to a human viewer; the third row of the microskills explanation table TBL.001 further associates the third microskill identifier MS.ID.003 with a digitized third microskill textual definition TXT.003 that is digitization of a human-readable character string that defines the third microskill to a human viewer. An Nth row of the microskills explanation table TBL.001 associates an Nth microskill identifier MS.ID.00N with an Nth microskill label LBL.N that is digitization of a human-readable character string that identifies an Nth microskill to a human viewer; the Nth row of the microskills explanation table TBL.001 further associates the Nth microskill identifier MS.ID.N with a digitized Nth microskill textual definition TXT.N that is digitization of a human-readable character string that defines the Nth microskill to a human viewer.

Figure 7:
FIG. 7 is a block diagram of aspects of a table of content references record of FIG. 1 and FIG. 2.

Referring now generally to the Figures and particularly to FIG. 7, FIG. 7 is a block diagram of aspects of the table of content references TBL.002. The second table TBL.002 associates and correlates informational content identifiers NF.ID.001-NF.ID.N with digitized textual informational content labels NF.LBL.001-NF.LBL.N and digitized informational descriptions NF.TXT.001-NF.TXT.N. To clarify by way of example, a first row of the table of content references TBL.002 associates a first informational content 1 identifier NF.ID.001 with a first digitized informational content label NF.LBL.001 that is a digitization of a human readable character string that identifies a first informational content to a human viewer; the first row of the table of content references TBL.002 also associates the first informational content identifier NF.ID.001 with a first informational content textual definition NF.TXT.001 that is digitization of a human-readable character string that defines the first informational content to a human viewer. A second row of the table of content references TBL.002 associates a second informational content 1 identifier NF.ID.002 with a second digitized informational content label NF.LBL.002 that is a digitization of a human readable character string that identifies a second informational content to a human viewer; the second row of the table of content references TBL.002 also associates the second informational content identifier NF.ID.002 with a second informational content textual definition NF.TXT.002 that is digitization of a human-readable character string that defines the second informational content to a human viewer. A third row of the table of content references TBL.002 associates a third informational content 1 identifier NF.ID.003 with a third digitized informational content label NF.LBL.003 that is a digitization of a human readable character string that identifies a third informational content to a human viewer; the third row of the table of content references TBL.002 also associates the third informational content identifier NF.ID.003 with a third informational content textual definition NF.TXT.003 that is digitization of a human-readable character string that defines the third informational content to a human viewer. An Nth row of the table of content references TBL.002 associates an Nth informational content 1 identifier NF.ID.N with an Nth digitized informational content label NF.LBL.N that is a digitization of a human readable character string that identifies an Nth informational content to a human viewer; the Nth row of the table of content references TBL.002 also associates the Nth informational content identifier NF.ID.N with an Nth informational content textual definition NF.TXT.N that is digitization of a human-readable character string that defines the Nth informational content to a human viewer.

Figure 8A:
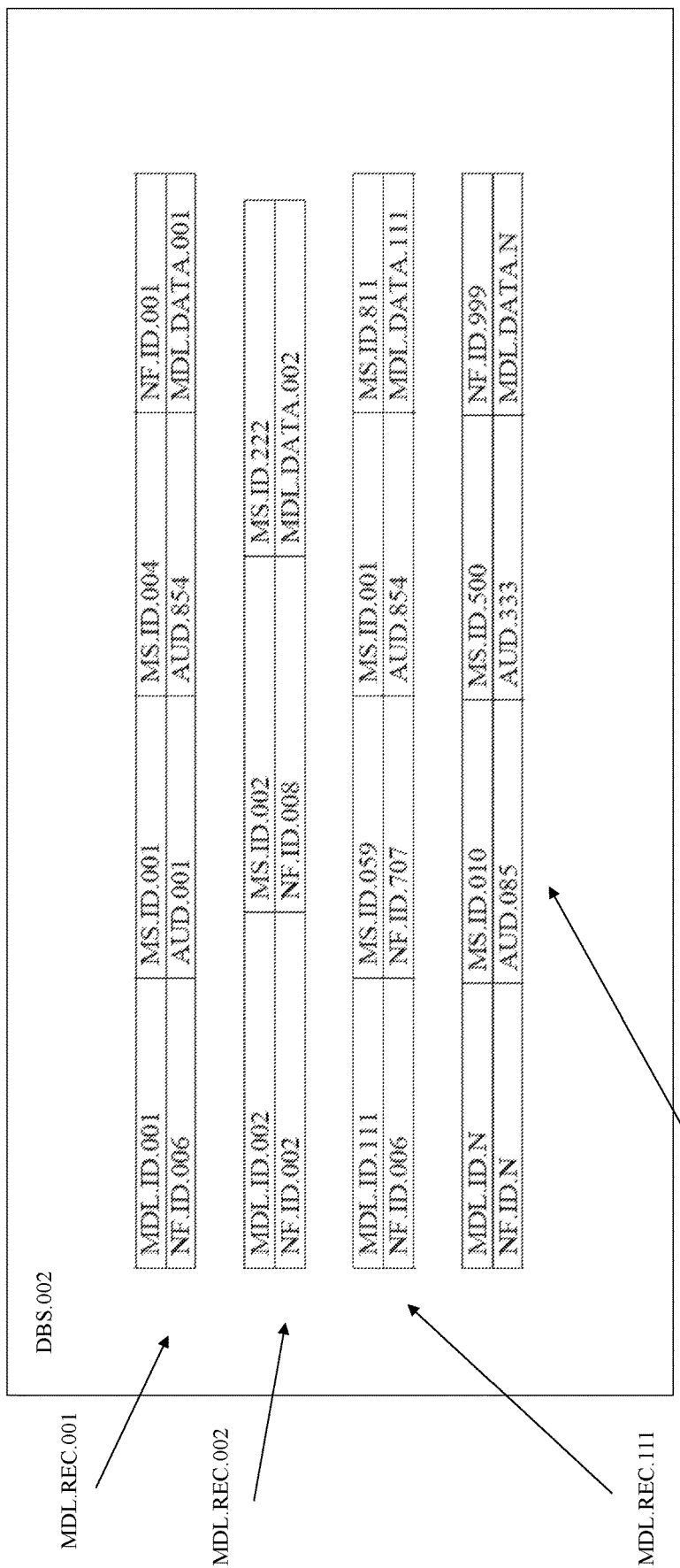
FIG. 8A is a block diagram of expanded exemplary model records of FIG. 5 maintained in a server or device of FIG. 1 or bi-directionally communicatively with the network of FIG. 1, wherein one or more additional characteristics associated with exemplary model records, such as a quality of a practitioner who is intended to view a selected video, a quality of audience members who are intended to be taught by the practitioner, a psychographic parameter associated with said audience and/or said practitioner, a demographic parameter associated with said audience and/or said practitioner, and/or an experience level associated with said audience and/or said practitioner.

Referring now generally to the Figures and particularly to FIG. 8a, FIG. 8A is a block diagram of expanded exemplary model records MDL.REC.001-MDL.REC.N maintained in a second database DBS.002 of a system 104, 106 & 108 of FIG. 1 suitable system, server or device known in the preferably, but not necessarily, bi-directionally communicatively with the network of FIG. 1.

One or more additional characteristic identifiers AUD.001-AUD.N individually associated with one or more exemplary model records MDL.REC.001-MDL.REC.N are presented in FIG. 8A. These additional characteristics separately indicated or represented by one or more additional characteristic identifiers AUD.001-AUD.N may be or comprise (a.) a quality of a practitioner who is intended to view rendering of one or more model data MDL.DATA.001-MDL.DATA.N, (b.) a quality of audience members who are intended to be taught by said practitioner, a psychographic parameter associated with said audience and/or said practitioner, a demographic parameter associated with said audience and/or said practitioner, and/or an experience level associated with said audience and/or said practitioner.

FIG. 8A shows the first model record MDL.REC.001 to additionally include the first digitized video and audio model data MDL.DATA.001, a first characteristic identifier AUD.001, and an $854^{th}$ characteristic identifier AUD.854. FIG. 8A additionally shows an 111th model record MDL.REC.111 to additionally include a $111^{th}$ digitized video and audio model data MDL.DATA.111, an $811^{th}$ microskill identifier MS.ID.811 and the $854^{th}$ characteristic identifier AUD.854. FIG. 8A yet additionally shows the Nth model record MDL.REC.N to include the Nth digitized video and audio model data MDL.DATA.N, an $85^{th}$ characteristic identifier AUD.085, and a 333rd characteristic identifier AUD.333.

Referring now generally to the Figures and particularly to FIG. 8B, FIG. 8B is a block diagram of an exemplary first request message REQ.MSG.001 as generated by a viewing system 108. The first request message REQ.MSG.001 includes a library network address LB.ADDR of the library system as a destination address, a viewing system network address NT.ADDR as the sender address, a first request message identifier REQ.MSG.ID.001, a first request message date time stamp RDTS.001 that indicates a time of origin of the comprising first request message REQ.MSG.001, a fourth microskill identifier MS.ID.004, a $811^{th}$ microskill identifier MS.ID.811 and the $854^{th}$ characteristic identifier AUD.854.

Figure 8C:
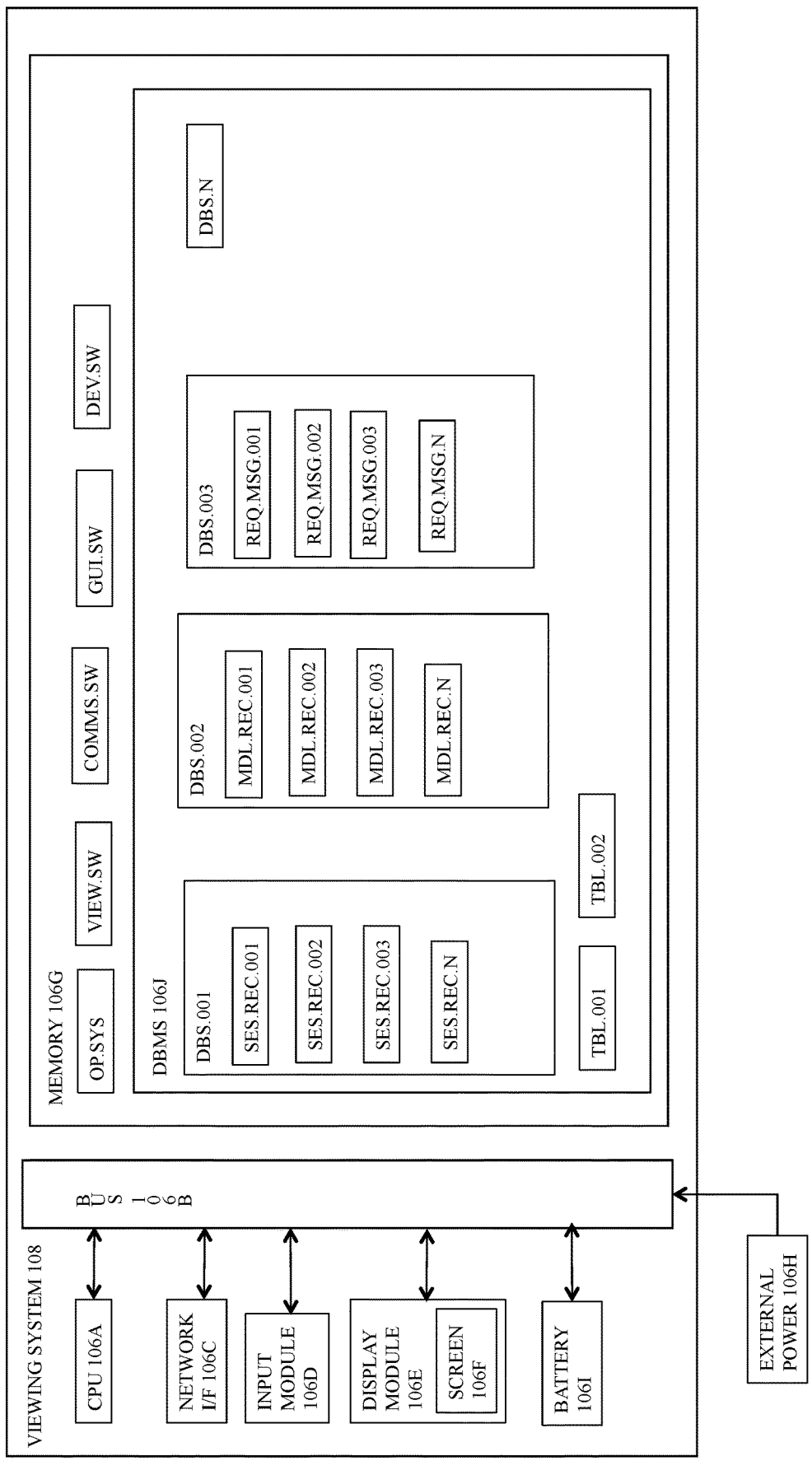
FIG. 8C is a block diagram of an exemplary viewing system of FIG. 1.

Referring now generally to the Figures and particularly to FIG. 8C, FIG. 8C is a block diagram of an exemplary viewing system 108. The viewing system 108 includes some or all elements and aspects of the library system 106 and further includes a viewing system software view that enables and directs the viewing system 108 to execute and perform one or more all of the relevant aspects of the invented method. The viewing system 108 further optionally includes a third database DBS.003 that stores a plurality of request messages REQ.MSG.001-REQ.MSG.N.

It is understood that the viewing system 108 may be or comprise, in whole or in part, one or more library systems 106 and/or one or more acquisition systems 104. It is further understood the acquisition system 104, in whole or in part, may be or comprise one or more library systems 106 and/or one or more viewing systems 108.

Figure 9:
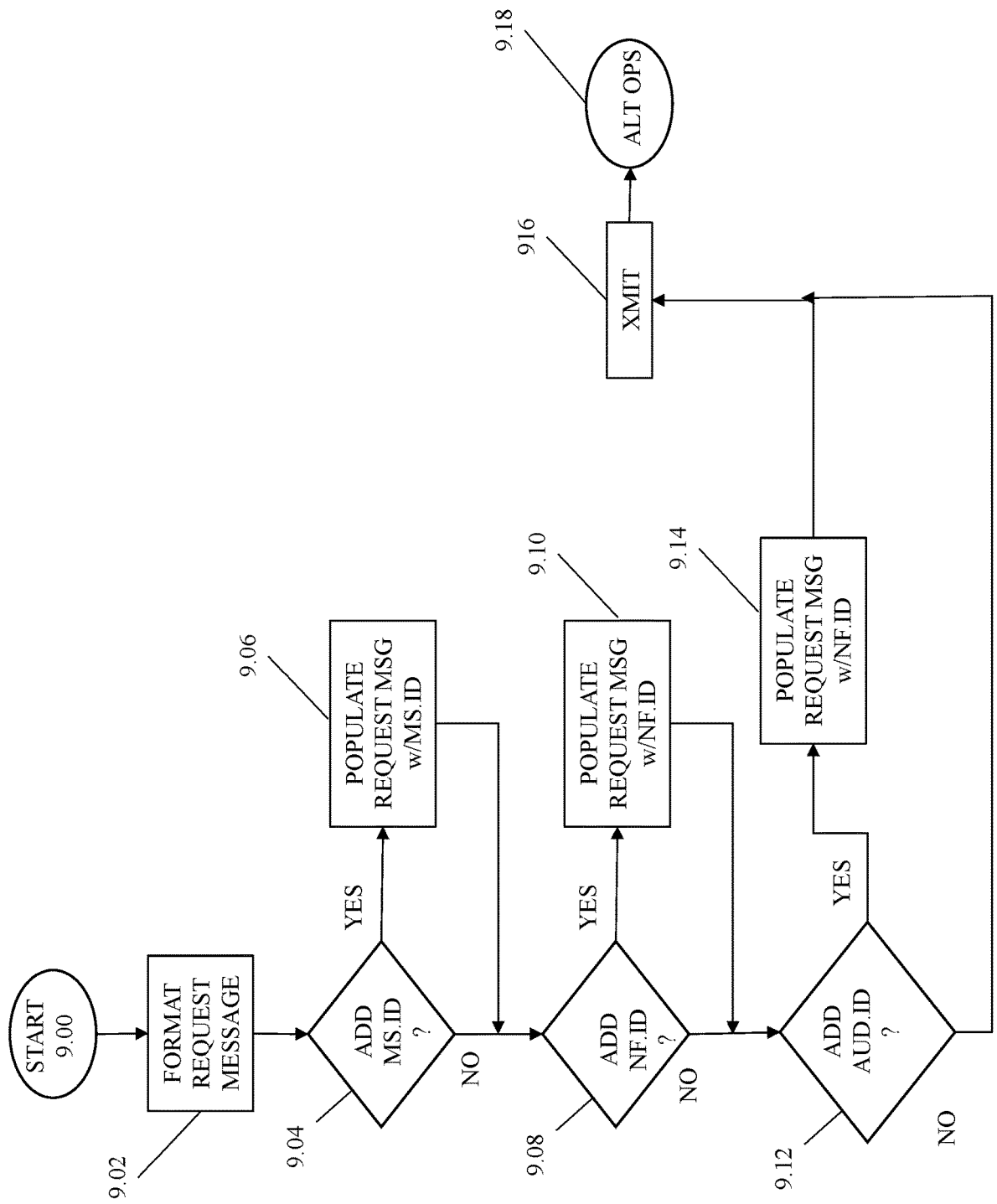
FIG. 9 is a flowchart of a generation of a request record of FIG. 8B.

Referring now generally to the Figures and particularly to FIG. 9, FIG. 9 is a flowchart of a generation of the first exemplary request message of FIG. 8B. In step For purposes of clarity of explanation and not offered as an expression of limitation of the scope of the invented method, the aspects of the following description of an exemplary instantiation of the steps of 9.00 through 9.18 will specify a human user (hereinafter, "the user") interacting and partially directing the activity of the viewing system 108 to generate and transmit the exemplary first request message REQ.MSG.001. It is understood that other preferred embodiments would in practice generate additional request messages REQ.MSG.002-REQ.MSG.N in interaction with one or more humans and/or information technology processes.

In step 9.00 the viewing system 108 powers up and prepares to accept instructions from the user. In step 9.02 the viewing system 108 initializes the first request message REQ.MSG.001 and writes into the first request message REQ.MSG.001 the library network address LB.ADDR as the destination address and the instant viewing system network address NT.ADDR as the sender address. In step 9.04 the viewing system 108 determines if the user is directing the inclusion of any microskill identifiers MS.ID.001-MS.ID.N into the first request message REQ.MSG.001 and, if so finding, writes the indicated or provided microskill identifiers MS.ID.001-MS.ID.N into the first request message REQ.MSG.001 in step 9.06. In the instance of the first request message REQ.MSG.001, the fourth microskill identifier MS>ID.004 and the 811$^{th}$ microskill identifier are added to the first request message REQ.MSG.001 in the instant execution of step 9.06

The viewing system 108 proceeds from either step 9.04 or step 9.06 on to execute step 9.08.

In step 9.08 the viewing system 108 determines if the user is directing the inclusion of any content identifiers NF.ID.001-NF.ID.N into the first request message REQ.MSG.001, and if so finding, writes the indicated or provided content identifiers NF.ID.001-NF.ID.N into the first request message REQ.MSG.001 in step 9.10. The sixth content identifiers NF.ID.006 added in the case of the first request message REQ.MSG.001. The viewing system 108 proceeds from either step 9.08 or step 9.10 on to execute step 9.12.

In step 9.12 the viewing system 108 determines if the user is directing the inclusion of any characteristic identifiers AUD.001-AUD.N into the first request message REQ.MSG.001, and if so finding, writes the one or more indicated or provided characteristic identifiers AUD.001-AUD.N into the first request message REQ.MSG.001 in step 9.14. In the instance of the first request message REQ.MSG.001, the 854th characteristic identifier AUD.001 is added to the first request message REQ.MSG.001 in the instant execution of step 9.14

The viewing system 108 proceeds from either step 9.12 or step 9.14 on to execute step 9.16 and to transmit the first request message REQ.MSG.001 to the library system 106, whereby the first request message REQ.MSG.001 may be received and/or detected by the library system in step 2.16 and therefrom processed and acted upon in step 2.18 through 2.30.

The viewing system 108 proceeds from step 9.16 to step 9.18 and to perform alternate computational operations, to include possibly generating and additional request message REQ.MSG.001-REQ.MSG.N.

Figure 10:
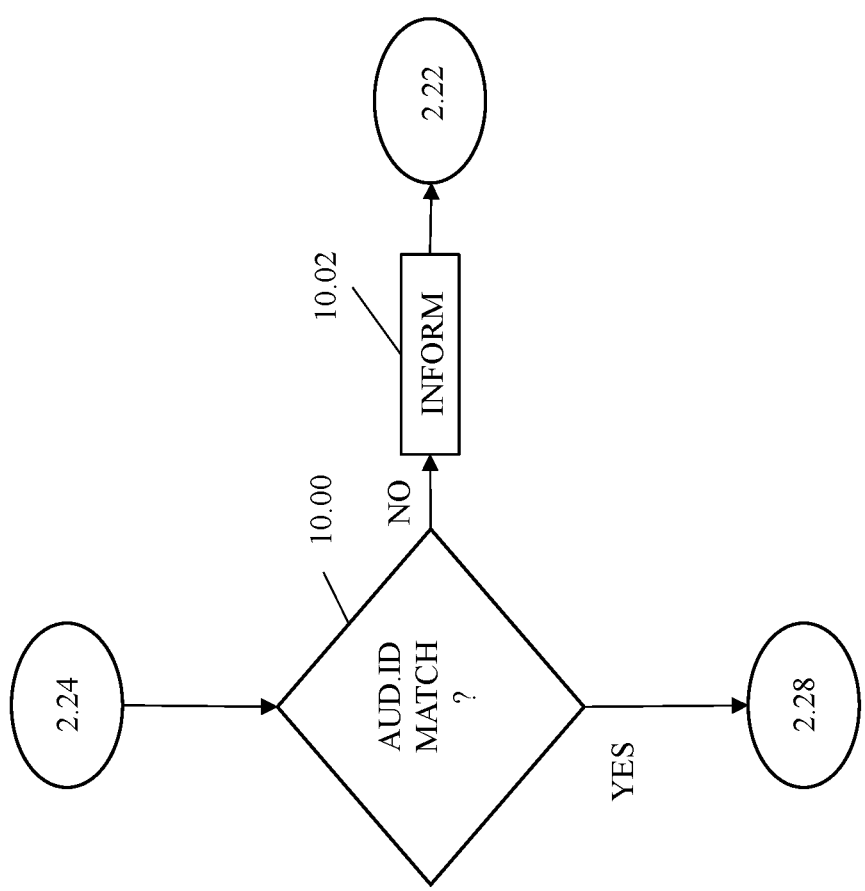
FIG. 10 is a flowchart of optional aspects of the first method of FIG. 2 as implemented by a library system or a viewing system optionally as directed by a user or an additional information technology process with a user and optionally in concert with the network of FIG. 1

It is understood that in certain still other alternate preferred embodiments of the invented method, that first request message may be both generated by aspects of the method of FIG. 9 and applied by some or all aspects of the method of FIG. 2 and/or FIG. 10.

Referring now generally to the Figures and particularly to FIG. 10, FIG. 10 is a flowchart of optional aspects of the first method of FIG. 2 as implemented by a library system or a viewing system optionally as directed by a user or an additional information technology process with a user and optionally in concert with the network of FIG. 1. In the optional method of FIG. 10, the library system 106 proceeds from step 2.24 to step 10.00 an attempts to match a characteristic identifier AUD.001-AUD.N of a received request message REQ.MSG.001-REQ.MSG.N with a model record data MDL.DATA.001-MDL.DATA.N of one or more model records MDL.REC.001-MDL.REC.N.

Of no match is found between an examined request message REQ.MSG.001-REQ.MSG.N and at least one model record MDL.REC.001-MDL.REC.N in step 10.00, the library system 106 proceeds on to execute optional step 10.02 or step 2.22. In optional step 10.02 the library system 106 communicates and informs a user or a viewing system 108 of this failure to find a match between one or more characteristic identifiers AUD.001-AUD.N of the instant received request message REQ.MSG.001-REQ.MSG.N with even one model record data MDL.DATA.001-MDL.DATA.N of one or more model records MDL.REC.001-MDL.REC.N.

In an alternative outcome to step 10.00, if a match is found between an examined request message REQ.MSG.001-REQ.MSG.N and at least one model record MDL.REC.001-MDL.REC.N in step 10.00, the library system 106 proceeds on to step 2.28.

It is understood that as the exemplary first request message REQ.MSG.001 is filtered through steps 2.18, 2.24, 2.28 and optional step 10.00, that the first model record MDL.REC.001 and the 111$^{th}$ model record MDL.REC.111 would be selected as matching the selection criteria of the first request message REQ.MSG.001, whereupon, the first model record MDL.REC.001 and the 111$^{th}$ model record MDL.REC.111, or the first model data MDL.DATA.001 and the 111$^{th}$ model data MDL.DATA.111, and/or pointers, addresses and or pointers thereto, are downloaded or streamed via the network 100 to one or more viewing systems 106.

It is understood in certain even other alternate preferred embodiments of the invented method, that the logic of optional step 2.24 is applied only to model records MDL.REC.001-MDL.REC.N that are found in step 2.18 to comprise at least one microskill identifier also referenced in the same and instant REQ.MSG.001-REQ.MSG.N.

It is further understood that the logic of optional step 2.24 is optionally applied only to model records MDL.REC.001-MDL.REC.N that are additionally found in step 10.00 to comprise at least one characteristic identifier AUD.001-AUD.N that is also referenced in the same and instant REQ.MSG.001-REQ.MSG.N.

It is understood that in various alternate preferred embodiments of the method of the present invention that the library system 106 may further comprise some or all of the aspects and elements of one or more of the viewing systems 108, wherein one or all of the steps and aspects of the methods of the Figures are performable and executed by the library system 106. It is understood that in other various alternate preferred embodiments of the method of the present invention that one or more viewing systems 108 may further comprise some or all of the aspects and elements of the library system 106, wherein one or all of the steps and aspects of the methods of the Figures are performable and executed by the instant viewing system 108.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

One or more of the aspects or steps, optional or essential, invented method may be implemented as software, firmware, hardware, module or engine. In one embodiment, the previous invented method description may be implemented by the general-purpose processor CPU 106A in the library system 106 to achieve the previously desired functions. In one embodiment, the invented method may be implemented as an engine or module which may include modules as subcomponents. In other embodiments, features of one or more of the described subcomponents may be combined or partitioned into different individual components, modules or engines.

Those of skill in the art would understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in data processing device containing hardware (e.g., hardware), software (e.g., the device software DEV.SW), a firmware, e.g., the device firmware DEV.FW, or any combination thereof. If implemented in software as a computer program product, the functions or modules may be stored on or transmitted over as one or more instructions or code on a computer-readable media (e.g., non-transitory machine-readable storage medium). Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for generating modular teaching microskills training sessions comprising:
   assigning a unique information identifier to each of a plurality of unique information elements in a one-to-one correspondence;
   selecting a plurality of teaching microskills to be modeled for observation by a practitioner;
   assigning a unique microskill identifier of a plurality of microskill identifiers to each teaching microskill in a one-to-one correspondence;
   digitizing a plurality of video models, wherein each digitized video model ("video model") records a demonstration of at least one teaching microskill applied in a presentation of at least one information element to an audience;
   assigning a first microskill identifier to at least one video model of the plurality of video models;
   assigning a first information identifier to the at least one video model;
   receiving a request to select at least one video model to which both the first microskill identifier is assigned and the first information identifier is assigned; and
   rendering to the practitioner the at least one video model meeting the selection criteria of having been assigned the first microskill identifier and the first information identifier.

2. The method of claim 1, wherein the rendering the first group of video models is performed by means of user interaction over an electronics communications network.

3. The method of claim 1, wherein the selecting a first group of video models is at least partially derived from an audience characteristic assigned to an intended audience associated with the practitioner.

4. The method of claim 3, wherein the audience characteristic is at least partially derived from an experience level parameter.

5. The method of claim 3, wherein the audience characteristic is at least partially derived from a demographic parameter.

6. The method of claim 1, wherein the audience characteristic is at least partially derived from a psychographic parameter.

7. The method of claim 1, wherein no two video models of the first group of video models are assigned a same microskill identifier.

8. The method of claim 1, wherein no two video models of the first group of video models are assigned a same information identifier.

9. The method of claim 1, further comprising selecting a linear microskills sequence of microskill identifiers and rendering the first group of video models in the linear microskills sequence in the presence of the practitioner.

10. The method of claim 1, further comprising selecting a sequence of microskill identifiers and rendering the first group of video models in the order of the selected sequence of microskill identifiers.

11. The method of claim 1, further comprising: assigning a unique information identifier to each of a plurality of information elements; assigning at least one information identifier to at least two video models of the plurality of video models; selecting a sequence of information identifiers and rendering the first group of video models in the order of the selected sequence of information identifiers.

12. The method of claim 1, further comprising associating a related network addresses with the first group of video models, wherein related network address is selectively applied by the practitioner to access additional information.

13. The method of claim 1, further comprising associating a plurality of related network addresses with the first group of video models, wherein each related network address is selectively applied by the practitioner to access additional information.

14. The method of claim 13, further comprising rendering at least one selectable representation of at least one related network address simultaneously with the rendering of the first group of video models.

15. The method of claim 1, further comprising assigning an audience characteristic value to at least one video model and a selecting the first group of video models in a process of matching the audience characteristic value.

16. The method of claim 1, further comprising assigning a practitioner characteristic value to at least one video model and selecting the first group of video models in a process of matching the practitioner characteristic value.

17. The method of claim 1, further comprising: selecting a microskill identifier; selecting a second group of video models that are each assigned the selected microskill identifier; and rendering the second group of video models for observation by the practitioner.

18. The method of claim 17, wherein the each video model of the second group of video models is selected in view of an associated indication of an audience characteristic.

19. The method of claim 1, further comprising: assigning a unique information identifier to each of a plurality of information elements; assigning at least one information identifier to at least two video models of the plurality of video models; selecting an information identifier; selecting a third group of video models that are each assigned the selected information identifier; and rendering the third group of video models for observation by the practitioner.

20. The method of claim 19, wherein each video model of the third group of video models is selected in view of an associated indication of an audience characteristic.

21. The method of claim 19, further comprising: selecting a first group of information identifiers from a plurality of information identifiers; selecting a second group of video models, wherein each microskills information identifier of the first group of microskill identifiers is assigned to at least one video model of the second group of video models, and each information identifier of the first group of information identifiers is assigned to at least one video model of the second group of video models; and rendering the second group of video models in a linear sequence in the presence of the practitioner.

* * * * *